US008115790B2

(12) United States Patent
Ito

(10) Patent No.: US 8,115,790 B2
(45) Date of Patent: Feb. 14, 2012

(54) MEDIUM DETECTING APPARATUS AND IMAGE FORMING APPARATUS

(75) Inventor: Masayuki Ito, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1038 days.

(21) Appl. No.: 11/691,537

(22) Filed: Mar. 27, 2007

(65) Prior Publication Data

US 2007/0222806 A1 Sep. 27, 2007

(30) Foreign Application Priority Data

Mar. 27, 2006 (JP) ................................ 2006-085964

(51) Int. Cl.

| | |
|---|---|
| ***G01D 15/06*** | (2006.01) |
| ***G01D 15/08*** | (2006.01) |
| ***B41J 2/325*** | (2006.01) |
| ***B41J 2/435*** | (2006.01) |

(52) U.S. Cl. ........ 347/164; 347/160; 347/215; 347/218; 347/262

(58) Field of Classification Search .................. 347/160, 347/164, 215, 218, 262
See application file for complete search history.

(56) References Cited

U.S. PATENT DOCUMENTS

| | | | | |
|---|---|---|---|---|
| 2005/0007404 | A1* | 1/2005 | Usui | 347/14 |
| 2006/0071418 | A1* | 4/2006 | Fukatsu et al. | 271/264 |
| 2007/0217839 | A1* | 9/2007 | Moteki et al. | 399/329 |

FOREIGN PATENT DOCUMENTS

| | | | |
|---|---|---|---|
| JP | 05246608 | A | 9/1993 |
| JP | 07009724 | A | 1/1995 |
| JP | 07-089643 | A | 4/1995 |
| JP | 09067044 | A | 3/1997 |
| JP | 09226200 | A | 9/1997 |
| JP | 2002160850 | A | 6/2002 |
| JP | 2002347986 | A | 12/2002 |
| JP | 2004307107 | A | 11/2004 |

* cited by examiner

*Primary Examiner* — Stephen Meier
*Assistant Examiner* — Sarah Al Hashimi
(74) *Attorney, Agent, or Firm* — Panitch Schwarze Belisario & Nadel LLP

(57) ABSTRACT

A medium detecting apparatus and an image forming apparatus are supplied capable of making medium move without hitting sensor lever while skew adjustment or medium setting operation. In the image forming apparatus, a medium hit surface of the sensor lever to detect skew holds inclinations in plural directions and a guider to limit the medium is furnished on the inclined side; or a medium hit surface of the sensor lever to detect skew holds inclinations in plural directions and position detections in movement direction of carriage and in conveyance direction of medium are performed by one sensor; or a sheet guider is further furnished and the sensor lever whose medium hit surface holds inclinations in plural directions is used as a sensor to detect a paper setting; or a hand-operated adjustment print function is further furnished and the sensor lever whose medium hit surface holds inclinations in plural directions is used as a sensor to detect a paper setting.

12 Claims, 12 Drawing Sheets

MEDIUM DETECTING APPARATUS AND IMAGE FORMING APPARATUS

BACKGROUND OF THE INVENTION

1. Field of the Invention

The invention relates to a medium detecting technology in an image forming apparatus to execute medium detection and execute print.

2. Related Background Art

Generally, a paper detecting sensor in a printer with former skew adjustment function is constructed as shown by FIG. 13A. Then, for example, when executing a print of manually supplying paper, an operator puts the paper 1 on a table 4 and sets the paper so as to make its front edge or its whichever corner of left and right touch a contact point position of a upper feed roller 2 and a lower feed roller 3, through a detection of the paper 1 executed by a table sensor 5, according to a command of a controlling section (not shown), a print operation is started.

The table sensor 5 generally is constructed by two of sensor substrate A (6) and sensor substrate B (7), on the sensor substrate A (6), a light emitting element 8 is installed; and on the sensor substrate B (7), a light receiving element 9. The table sensor 5 detects the paper 1 as a light penetrating type sensor. The table sensor 5 plurally arranged in a breadth direction in order to realize a free location function that not only can perform skew adjustment, but also can detect position of the paper 1 for printing, at which position soever the paper 1 is set on the table 4 in left direction or right direction.

When detected the paper 1 by the above-stated structure, as shown by FIG. 13B, firstly, a cam 11 coupled by a drive of a motor 10 turns, and a linked piece 12 drops the upper skew adjusting roller 13 to press and contact with the lower skew adjusting roller 14 so as to enter a skew adjustment mode.

Then, a skew adjusting motor 15 start to drive, the drive is transmitted to the lower skew adjusting roller 14 and a skew adjusting roller pulley 16 on the same shaft via a belt 17. Through the rotations of the upper skew adjusting roller 13 and the lower skew adjusting roller 14, the paper 1 is conveyed, and all of front edge of the paper 1 hits the contact points of the feed rollers 2 and 3 that are stopping. Because the feed force of the skew adjusting rollers 13 and 14 is very little, after the paper 1 hit, the skew adjusting rollers 13 and 14 only slip until they stop rotating.

Because the shaft direction of the feed rollers 2 and 3 is set to be parallel with the operation direction (toward the inner from the surface of the paper) of a carriage 18 which loads a head, through the above stated operations, the skew of the paper 1 is adjusted. Then, while the feed rollers 2 and 3 convey the paper 1, the skew adjusting rollers 13 and 14 open to move to positions making a movement load of the paper 1 lose, thus a paper conveyance mode is carried out, and the paper 1 is conveyed to a print position.

In the apparatus with the above stated structure, because a sensor substrate A (6) and a sensor substrate B (7) are mounted up and down, a problem occurs, that is, the number of parts such as connection cord (not shown) to connect them and the like increases, and cost become high. In order to solve such problem, as shown by FIG. 14, a sensor lever manner to mount sensor only on one direction side is used (for example, see patent document 1).

In the sensor lever manner, a sensor lever 20 having a turning pivot 19 is pressed by the passage of the paper 1 so that a shading section 21 turns with respect to the turning pivot 19. Thus, a light penetrating sensor 23 is opened from a shaded state that it is shaded by the shading section 21 when the paper 1 does not exist, and receives penetrating light. Thereby, it is detected that the paper 1 has passed.

Patent document 1: Japan patent publication H7-89643.

However, regarding the detection of the paper 1 performed by the sensor lever 20, it is performed not only while the conveyance of the paper 1, but also while the skew adjustment. Further, in the case to detect the paper 1 by the conventional sensor lever 20, such problem exists, that is, as shown by FIG. 15, when to adjust the skew, because the paper 1 turns as shown by an arrow on a-part in drawing, the paper 1 hit the side surface of the sensor lever 20, and a skew adjustment can not be executed.

SUMMARY OF THE INVENTION

It is, therefore, an object of the invention to provide a medium detecting apparatus and an image forming apparatus capable of solving the above problem.

According to the present invention, there is provided a medium detecting apparatus, comprising a medium hit portion having a medium hit surface holding inclinations at least in a conveyance direction of medium and in a width direction of the medium, wherein a medium detection is performed through detecting that the medium hit portion is pressed downward by a hit of the medium toward the medium hit surface.

Moreover, the medium detecting apparatus may further comprise a guider furnished near the medium hit surface to limit the medium.

Moreover, the medium detecting apparatus may further comprise a shading section which turns through the pressing downward; and a sensor which detects the turn of the shading section, wherein the medium is detected according to an output of the sensor.

Moreover, in the medium detecting apparatus, an outside diameter above a position in which the medium hits the medium hit portion may be smaller than that under the position.

Moreover, in the medium detecting apparatus, an outside diameter may gradually decrease near a position in which the medium hits the medium hit portion.

Moreover, in the medium detecting apparatus, the medium hit portion may approximately indicate either of a conic shape and a truncated cone shape.

Further, according to the present invention, there is provided an image forming apparatus, comprising a medium detecting apparatus, wherein the medium detecting apparatus includes a medium hit portion having a medium hit surface holding inclinations at least in a conveyance direction of medium and in a width direction of the medium, wherein a medium detection is performed through detecting that the medium hit portion is pressed downward by a hit of the medium toward the medium hit surface.

Moreover, in the image forming apparatus, the medium detecting apparatus may further include a guider furnished near the medium hit surface to limit the medium.

Moreover, in the image forming apparatus, the medium detecting apparatus may further include a shading section which turns through the pressing downward; and a sensor which detects the turn of the shading section, wherein the medium is detected according to an output of the sensor.

Moreover, in the image forming apparatus, an outside diameter above a position in which the medium hits the medium hit portion may be smaller than that under the position.

Moreover, in the image forming apparatus, an outside diameter may gradually decrease near a position in which the medium hits the medium hit portion.

Moreover, in the image forming apparatus, the medium hit portion may approximately indicate either of a conic shape and a truncated cone shape.

Moreover, in the image forming apparatus, the medium detecting apparatus may be used to serve as a detecting sensor for executing a skew adjustment.

Moreover, in the image forming apparatus, the medium detecting apparatus may be used to serve as sensors to detect a movement of a carriage and to detect the medium.

Moreover, the image forming apparatus may further comprise a sheet guider, wherein the medium detecting apparatus may be used to serve as sensor to detect a setting of the medium.

Moreover, the image forming apparatus may further comprise a hand-operated adjustment print function, wherein the medium detecting apparatus may be used to serve as sensor to detect a setting of the medium.

THE EFFECT OF THE PRESENT INVENTION

According to the present invention, because the sensor lever comprises is a medium hit portion which has a medium hit surface holding inclination at least along medium conveyance direction and width direction, and detects that the medium hit portion is pressed downward by a hit of the medium toward the medium hit surface, it is possible to certainly detect out the paper and to execute an skew adjustment without that the paper un-moves after hit the sensor lever.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings. Moreover, in the following embodiments, a general serial impact type printer is explained as an example, but the present invention is not limited by the example.

Embodiment 1

An image forming apparatus of embodiment 1 makes a paper hit surface of a sensor lever for detecting skew hold inclinations in plural directions and be pressed down through a hit of medium.

Figure 1:
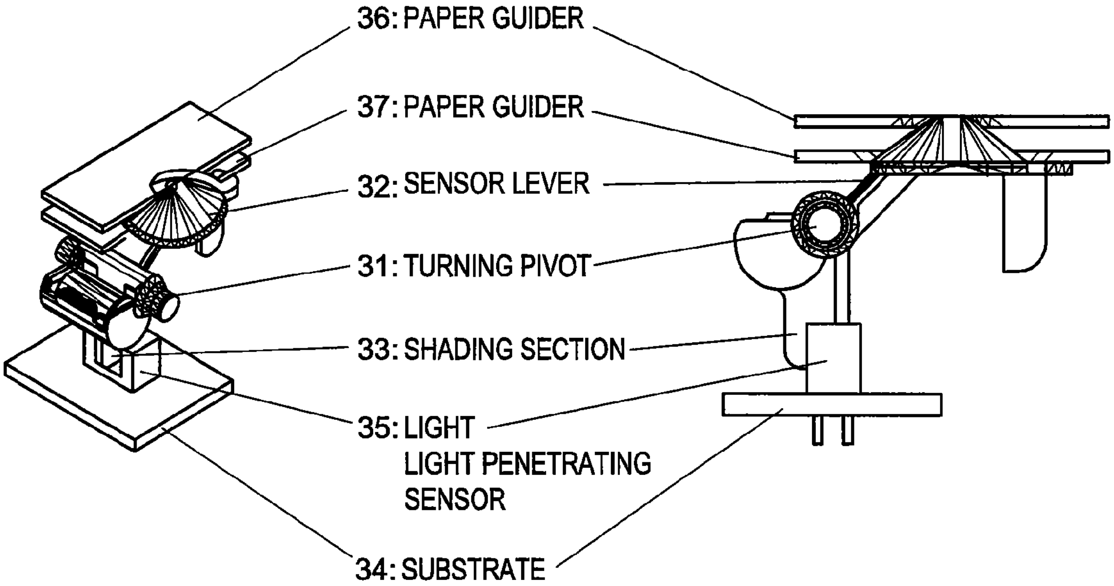
FIG. 1 is a diagram showing a structure of a sensor lever in embodiment 1 of the present invention.

FIG. 1 is a diagram showing a structure of a sensor lever in embodiment 1 of the present invention. A sensor lever 32 with a turning pivot 31 holds inclinations in all directions of 360 degrees, paper guiders 36 and 37 are used to limit the paper to move up or down in order to make an edge of the paper always flatly touch an inclined surface. Then, a shading section 33 of the sensor lever 32 which turns because of a down pressure of the limited paper 1 opens a light penetrating sensor 35 furnished on a substrate 34 so that the paper 1 is detected.

Figure 2:
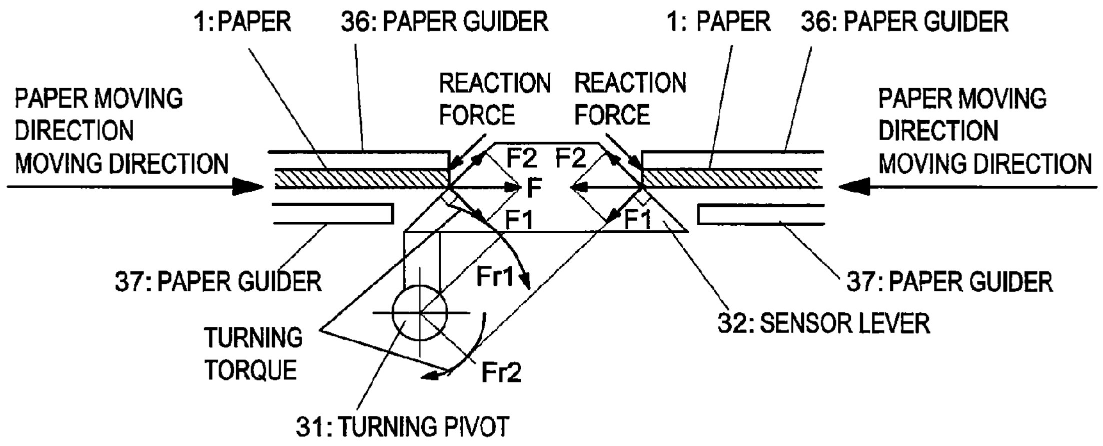
FIG. 2 is a diagram to explain function of a sensor lever in embodiment 1.

FIG. 2 is a diagram to explain the function of a sensor lever in embodiment 1, also is a diagram showing a relation between inclination and turning direction of the sensor lever 32. As shown by the diagram, when the paper 1 begins moving along a direction shown on the left side or the right side and hits the sensor lever 32 on the inclined surface, a pressure F of the paper 1 is resolved into a force F1 in the turning direction of the sensor lever 32 and a friction force F2 between the paper 1 and the inclined surface. Then, because the inclined surface of the sensor lever 32 is made from a material of plastic or metal, does not produce friction force, so the paper 1 will not move due to the limitation of the paper guider 36. Thus, the force F2 is counteracted by a rebound force of the paper guider 36.

When the force F1 acts on the sensor lever 32, with respect to the turning pivot 31, a turning torque is produced in the direction of an arrow Fr1. The inclination of the sensor lever 32 is set to be able to get enough force F1 so as to make the sensor lever 32 turn by the paper 1, at the same time, also is set to be able to produce enough turning torque with respect to the turning pivot 31 even though the paper 1 presses towards the sensor lever 32 from other directions.

Figure 3A:
FIG. 3A is a diagram showing a shape transformation example of a medium hit portion of a sensor lever in embodiment 1.
Figure 3B:
FIG. 3B is a diagram showing a shape transformation example of a medium hit portion of a sensor lever in embodiment 1.
Figure 3C:
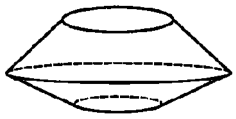
FIG. 3C is a diagram showing a shape transformation example of a medium hit portion of a sensor lever in embodiment 1.

Moreover, the medium hit portion of the sensor lever 32 may be any other shape instead of trapezoid so long as the sensor lever can be turned by the paper 1. For example, a lune shape as shown by FIG. 3A; a triangle pyramid shape as shown by FIG. 3B; a shape with a trapezoid added on the underside as shown by FIG. 3C.

Figure 3D:
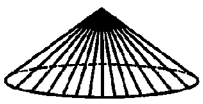
FIG. 3D is a diagram showing a shape transformation example of a medium hit portion of a sensor lever in embodiment 1.

Or, the medium hit portion of the sensor lever 32 also may just hold inclination in directions of a predetermined range instead of in all directions, and it also may has such shape as a hollowed structure shown by FIG. 3D. Furthermore, if setting the inclinations to be different in respective directions, it is possible to obtain all kinds of forces F1 and all kinds of turning torques respectively corresponding to the forces F1.

<Operations>

Figure 4:
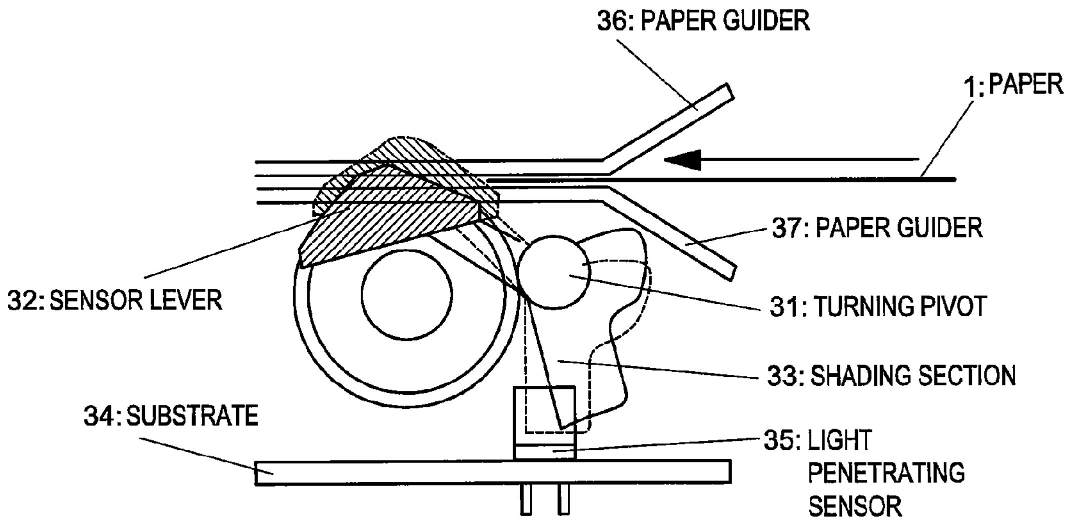
FIG. 4 is a diagram to explain operations of a sensor lever in embodiment 1.
Figure 5:
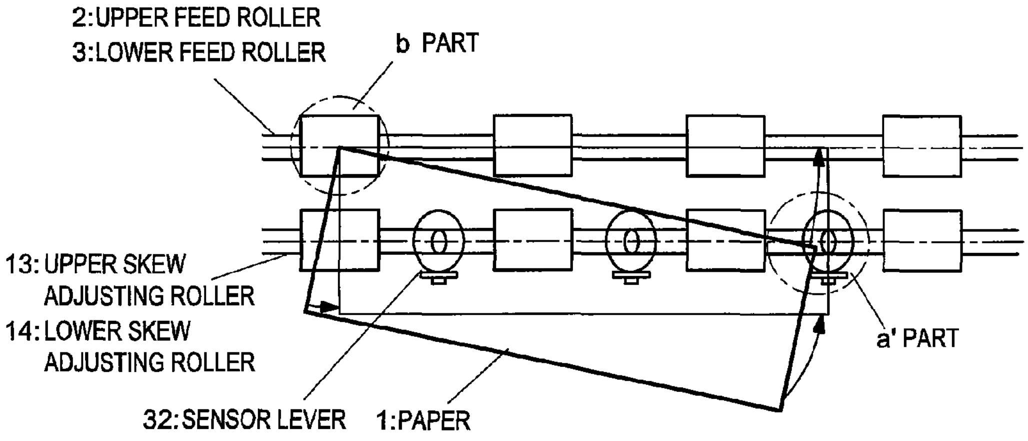
FIG. 5 is a diagram to explain operations of a skew adjustment in embodiment 1.

FIG. 4 is a diagram to explain operations of a sensor lever in embodiment 1; and FIG. 5 is a diagram to explain operations of a skew adjustment in embodiment 1.

Firstly, when the paper 1 moves as shown by the arrow and hits the inclined surface of the sensor lever 32 so as to produce a turning torque with respect to the turning pivot 31, as shown by FIG. 4, the sensor lever 32 turns from the position with broken line to the position with solid line. Then, because the shading section 33 that is shading the light penetrating sensor 35 leaves from the light penetrating sensor 35, so the penetrating light is able to penetrate. Thereby, the sensor lever 32 is detected that it has begun to turn.

The following is to explain operation of skew adjustment by using the sensor lever 32.

Firstly, as shown by FIG. 5, as soon as the paper 1 passes any position of the sensor lever 32, the paper 1 is judged having be set, then, a upper skew adjusting roller 13 goes down to press and contact with a lower skew adjusting roller 14, so as to enter a skew adjustment mode.

And then, the paper 1 is conveyed through rotation the skew adjusting rollers 13 and 14, as shown by the part b, the front edge of the paper 1 hits the contact points of feed rollers 2 and 3 that are stopping. Then, until the whole front edge of the paper 1 hits the contact points of the feed rollers 2 and 3, the skewing paper 1 turns along the arrow direction, here, as shown by the part a, the paper 1 hits the sensor lever 32 at a slant from lateral side.

Because the paper-feeding force of the skew adjusting rollers 13 and 14 is puny, after the whole front edge of the paper 1 hits the contact points of the feed rollers 2 and 3, until the skew adjusting rollers 13 and 14 stop slipping, the whole front edge of the paper 1 is placed being parallel with the axis direction of the feed rollers 2 and 3, thus, the skew adjustment ends.

<Effect of the Embodiment 1>

According to the image forming apparatus of the embodiment 1 stated above, because the paper hit surface of the sensor lever is made to hold inclination in plural directions and is pressed down by the hit of the mediums, it is possible to certainly detect out the paper and to execute an skew adjustment without that the paper un-moves after hit the sensor lever.

Embodiment 2

An image forming apparatus of embodiment 2 makes a paper hit surface of a sensor lever for detecting skew hold inclinations in plural directions, and uses one sensor to perform position detections of paper in a movement direction of carriage and in a conveyance direction of paper.

Figure 6:
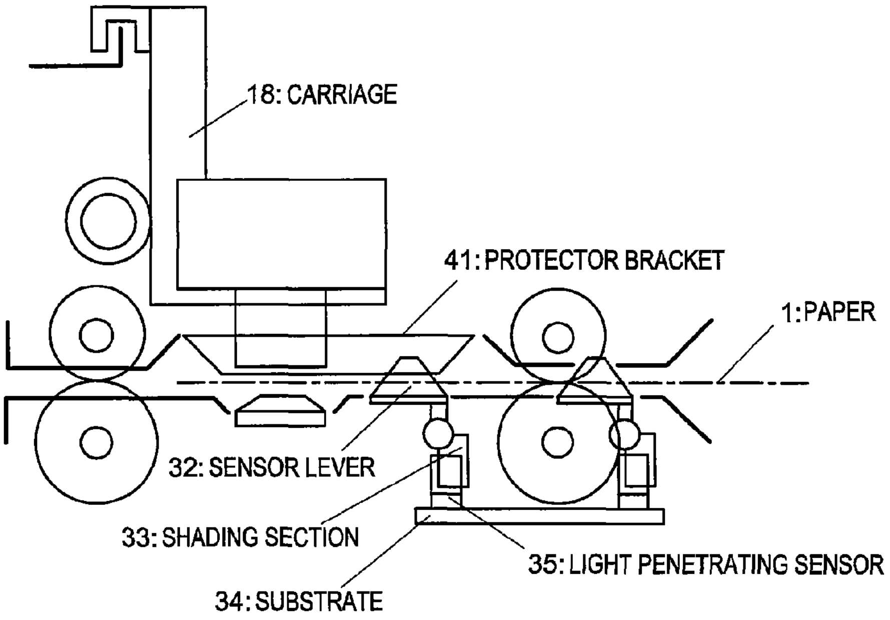
FIG. 6 is a diagram showing a structure of an image forming apparatus in embodiment 2.
Figure 7:
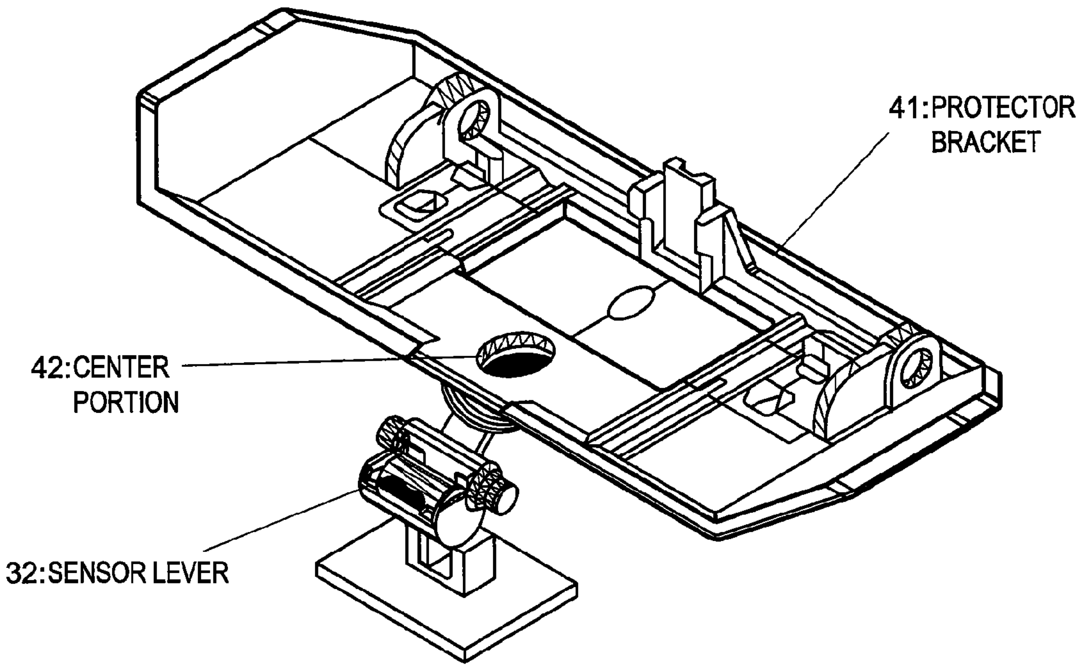
FIG. 7 is a diagram showing a structure of a ribbon protector in embodiment 2.

FIG. 6 is a diagram showing a structure of an image forming apparatus in embodiment 2; and FIG. 7 is a diagram showing a structure of a ribbon protector in embodiment 2. That is, the FIG. 6 showed the circumference of a carriage in the image forming apparatus of the embodiment 2, and the FIG. 7 showed a protector bracket 41 and a sensor lever 32.

Figure 8:
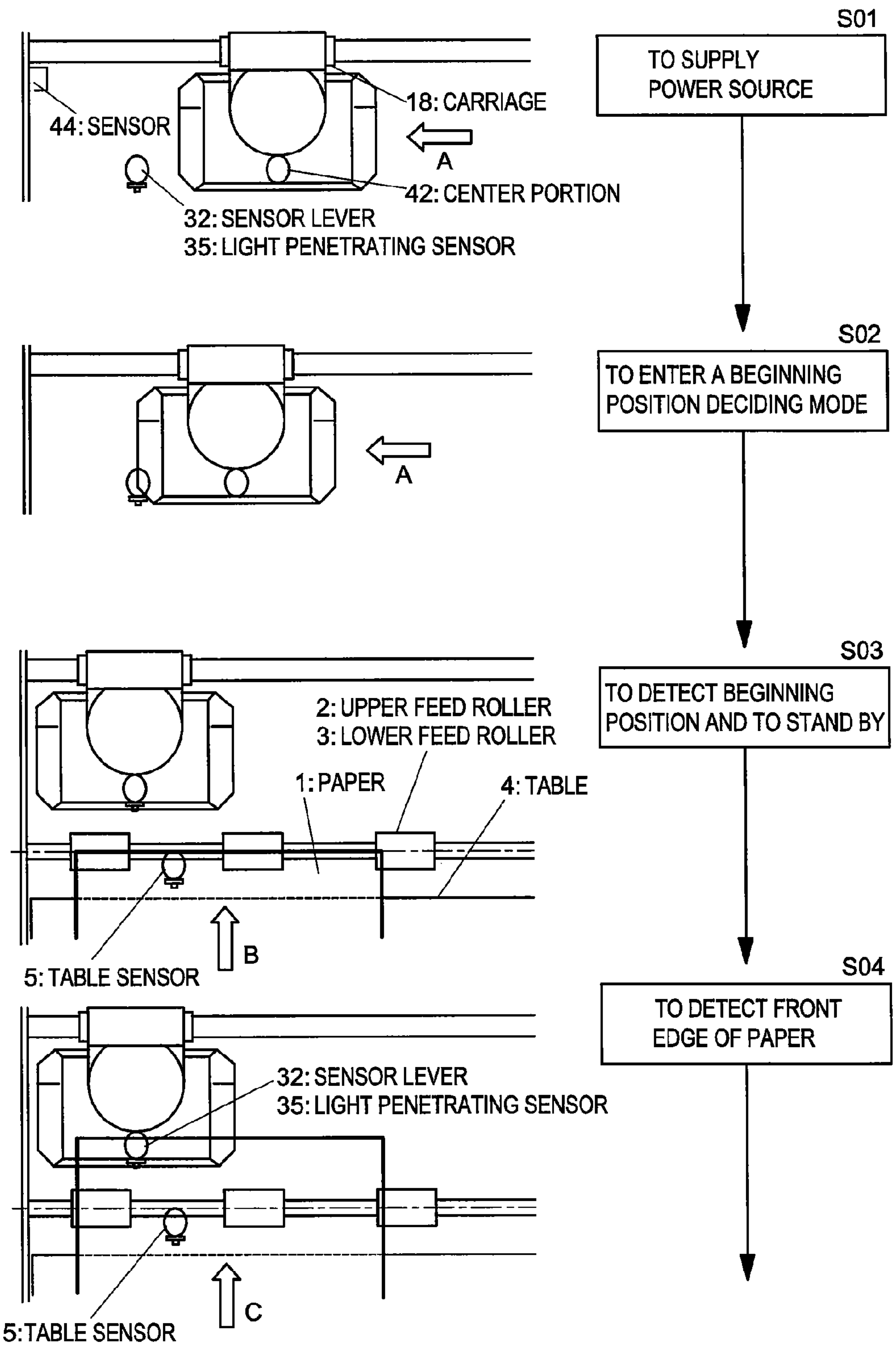
FIG. 8 is a diagram to explain operations of an image forming apparatus in embodiment 2.

In the image forming apparatus of the embodiment 2, as shown by FIG. 8 which will be stated below, when a carriage 18 moved to a beginning position, the protector bracket 41 loaded on the carriage 18 goes across the sensor lever 32.

The sensor lever 32, when being pressed downward by the protector bracket 41 as the structure in embodiment 1, through that the shading section 33 turns to open the light penetrating sensor 35 on the substrate 34, detects the position of the protector bracket 41.

The protector bracket 41 is constructed as shown by the FIG. 7. On its center portion 42, a hole is furnished, when the center portion 42 comes to the upside of the sensor lever 32 in a state that the paper 1 does not exist, the sensor lever 32 which is pressed downward for a time by the protector bracket 41 returns to original position.

In general, because the movement of the carriage 18 is executed by an open control, a sensor 44 is mounted in the movement direction of the carriage 18 as shown by a broken line used for deciding the beginning position. However, in the image forming apparatus of the embodiment 2, because the sensor lever 32 also fulfills the function of the sensor 44, and when the protector bracket 41 presses downward the sensor lever 32 for a time by the movement of the carriage 18, and the sensor lever 32 returns again a position by the center portion 42 of the protector bracket 41, the return position can be judged being the beginning position, so it is unnecessary to furnish the sensor 44.

<Operations>

FIG. 8 is a diagram to explain operations of an image forming apparatus in embodiment 2. On the right side in the same drawing, a flow is shown.

Firstly, when the power source of the image forming apparatus is supplied (Step S01), according to a command of a controlling section (not shown), the carriage 18, as shown by an arrow A in the drawing, starts to move toward a left direction which serves as a standard in order to decide a beginning position. When the sensor lever 32 is pressed downward by the protector bracket 41, the movement speed of the carriage 18 is reduced slowly so as to enter a beginning position deciding mode (Step S02).

Then, the center portion 42 of the protector bracket 41 locates above the sensor lever 32, and a position in which the sensor lever 32 returns is judged being the beginning position so as to enter a standing-by state. Continuously, an operator sets the paper 1 on the table 4 as shown by an arrow B in the drawing, and makes the front edge of the paper 1 hit the contact point position of the feed rollers 2 and 3 (Step S03).

Further, when the setting of the paper 1 is detected by the table sensor 5, according to a command of the controlling section (not shown), the feed rollers 2 and 3 rotates to convey the paper 1 as shown by an arrow C. Then, through the paper 1 passes over the sensor lever 32, because the sensor lever 32 is pressed downward again, and the light penetrating sensor 35 which is shaded by the shading section 33 is opened, so the front edge position of the paper 1 is detected, that is, the head position of the paper 1 is detected (Step S04).

As stated above, because the paper hit surface of the sensor lever 32 is made to hold inclinations in all directions, so it is possible to use the sensor lever 32 not only serving as a position detecting sensor while the movement of the carriage 18, but also serving as a position detecting sensor in the conveyance direction of the paper 1.

<Effect of the Embodiment 2>

According to the image forming apparatus of the embodiment 2 stated above, because the paper hit surface of the sensor lever is made to hold inclination in plural directions, and the position detections in the movement direction of the carriage 18 and the conveyance direction of the paper 1 is performed by one sensor, it is possible to certainly detect the medium and to decrease the number of parts for detection use. As a result, space can be saved and cost can be reduced.

Embodiment 3

An image forming apparatus of embodiment 3 is an image forming apparatus which comprises a sheet guider. In the image forming apparatus, a sensor lever whose paper hit surface holds inclinations in plural directions is furnished as a sensor to detect paper setting.

Figure 9:
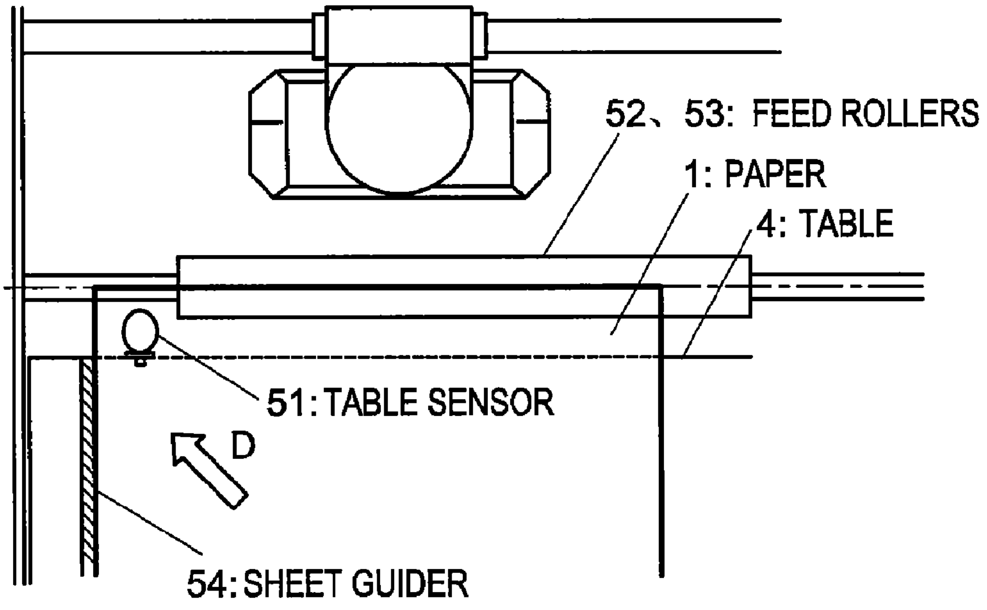
FIG. 9 is a diagram showing a structure of an image forming apparatus in embodiment 3.

FIG. 9 is a diagram showing a structure of an image forming apparatus in embodiment 3.

In general, in an image forming apparatus which has not skew adjustment function, in order to prevent the skew, a sheet guider 54 is furnished as shown by FIG. 9, and the paper 1 is set by making the paper 1 hit the sheet guider 54. In the image forming apparatus of the embodiment 3, a sensor lever 32 having inclinations in all directions of 360 degrees and a turning pivot 31 is furnished as a table sensor 51 for detecting the setting of the paper 1, and the sensor lever 32 is pressed downward by setting the paper 1, then the shading section 33 turns to open the light penetrating sensor 35 on the substrate 34, thus, a detection is performed.

In order to certainly detect the setting of the paper 1, the position of the table sensor 51 is set at the right side than the sheet guider 54 on the table 4 which is hit as a left edge standard, but at the front side than the contact points of feed rollers 52 and 53 that are hit as a front edge standard of the paper 1, the position best is such position which does not leave the intersecting position of the front edge and the left edge as much as possible.

Further, in the image forming apparatus of the embodiment 3, the feed rollers 52 and 53 that are hit while setting the paper 1 are formed into a long roller shape with a shaft, its surface is made of material such as plastic, metal or the like so as to the paper 1 slips easily.

<Operations>

Figure 10A:
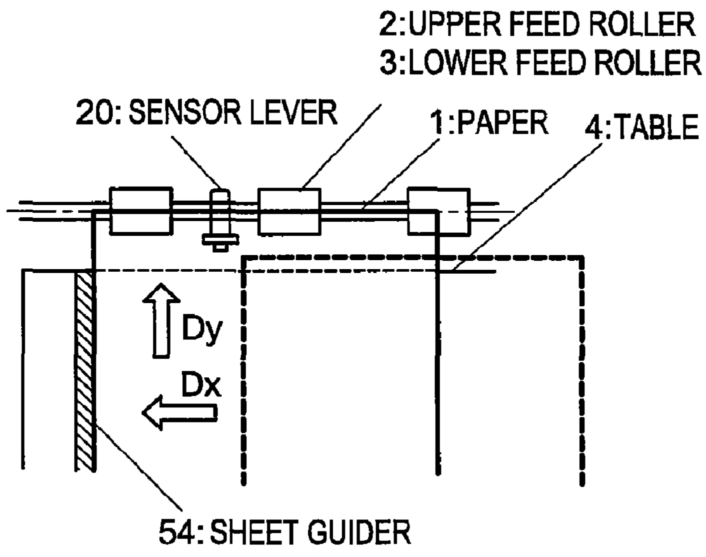
FIG. 10A (PRIOR ART)
FIG. 10A is a diagram to explain operations of a conventional image forming apparatus.
Figure 10B:
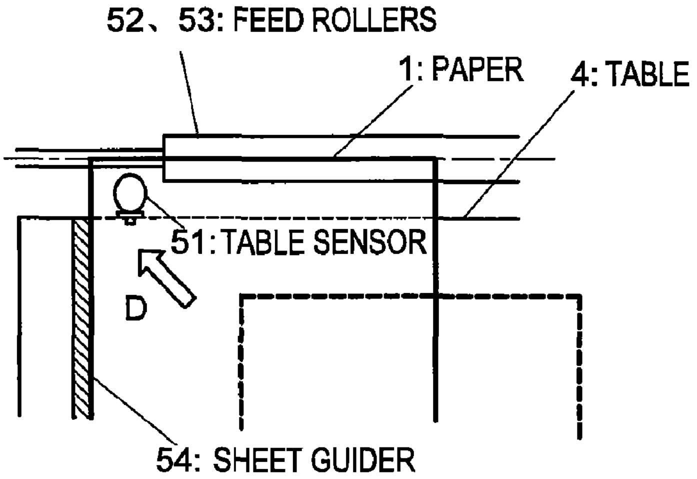
FIG. 10B is a diagram to explain operations of an image forming apparatus in embodiment 3.

FIG. 10A is a diagram to explain operations of a conventional image forming apparatus; and FIG. 10B is a diagram to explain operations of an image forming apparatus in embodiment 3.

In conventional image forming apparatus, when setting the paper 1, as shown by FIG. 10A, two operations must be performed. That is, first is to make the left edge of the paper 1 hit (arrow Dx direction) the sheet guider 54 on the table 4, next is to make the front edge of the paper 1 hit (arrow Dy direction) the contact points of the feed rollers 2 and 3. If doing the operations according to contrary order, that is, first is to hit along the arrow Dy direction and next is to hit along the arrow Dx direction, because the paper 1 would be scratched by gap of the plural rollers or by the sensor lever 20, so a correct setting can not be performed.

In the image forming apparatus of the embodiment 3, because the sensor lever whose paper hit surface holds inclinations in all directions of 360 degrees is used to serve as a table sensor 51, so it is possible to set the paper 1 without that the paper 1 hits the sensor lever, even if only using one operation to set the paper 1 along a slant direction such as the arrow D direction.

<Effect of the Embodiment 3>

According to the image forming apparatus of the embodiment 3 stated above, in the image forming apparatus comprising a sheet guider, because a sensor lever whose paper hit surface holds inclinations in plural directions is furnished as a sensor to detect paper setting, and the feed rollers are made of material making the paper 1 slip easily, it is possible to set the paper 1 only by using one operation. As a result, the operation performance can be improved.

Embodiment 4

An image forming apparatus of embodiment 3 is an image forming apparatus which has a function capable of executing a hand-operated adjustment print. In the image forming apparatus, a sensor lever whose paper hit surface holds inclinations in plural directions is furnished as a sensor to detect paper setting.

Figure 11A:
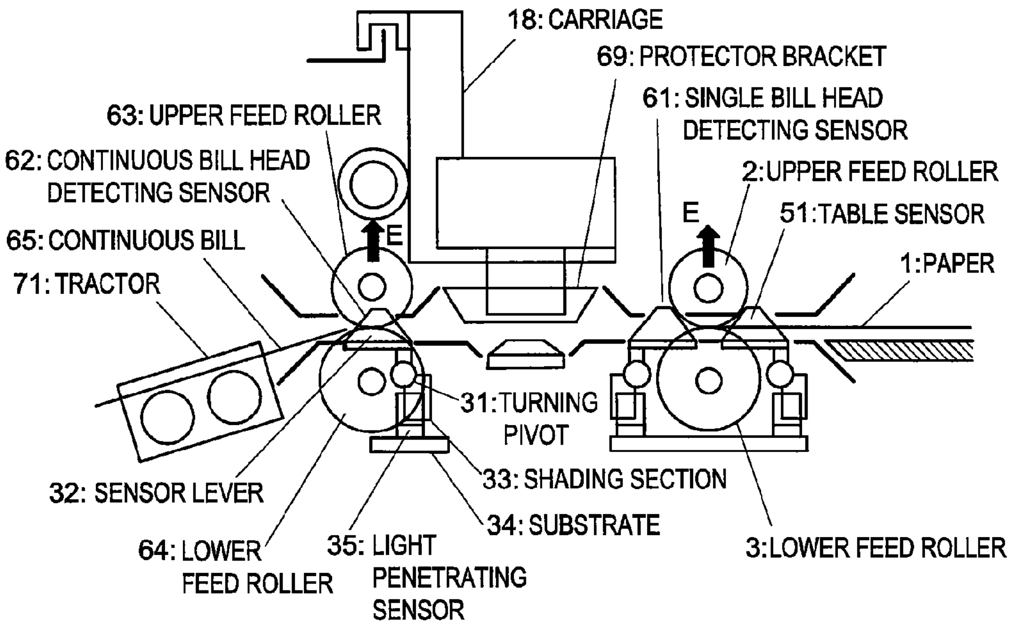
FIG. 11A is a diagram showing a structure of an image forming apparatus in embodiment 4.
Figure 11B:
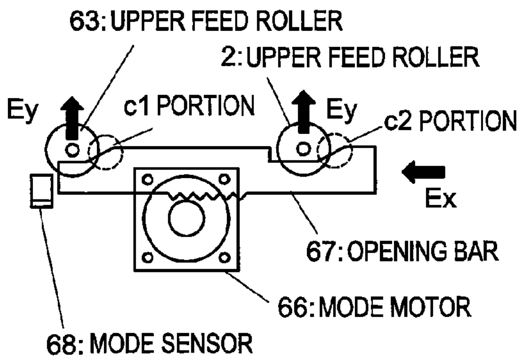
FIG. 11B is a diagram showing a structure of an image forming apparatus in embodiment 4.
Figure 11C:
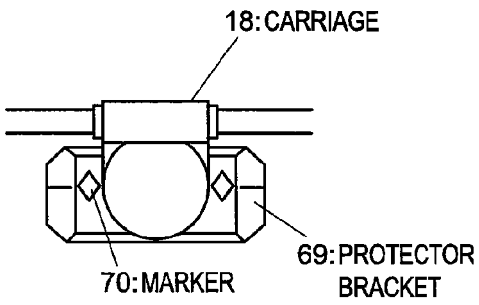
FIG. 11C is a diagram showing a structure of an image forming apparatus in embodiment 4.

FIG. 11A is a diagram showing a structure of an image forming apparatus in embodiment 4; FIG. 11B is a diagram showing a structure of an image forming apparatus in embodiment 4; and FIG. 11C is a diagram showing a structure of an image forming apparatus in embodiment 4.

The FIG. 11A showed a whole structure of an image forming apparatus in embodiment 4. The image forming apparatus of the embodiment 4 has a hand-operated adjustment print function capable of executing a print in a desired position of the paper 1 desired by operator. In order to execute the hand-operated adjustment print, a table sensor 51 to perform a detection of the paper 1, a single bill (i.e. single paper, also i.e. separated type paper) head detecting sensor 61 and a continuous bill (i.e. continuously arranged type paper) head detecting sensor 62 serve as a sensor lever whose paper hit surface holds inclinations in all directions of 360 degrees.

Then, as a retreating function of a continuous bill 65 having been performed print, a mechanism is furnished which opens feed rollers 2 and 3, and feed rollers 63 and 64 according to a command of a controlling section (not shown). When operator pressed a retreating switch (not shown), a mode motor 66 drives according to a command from the controlling section, then as shown by FIG. 11B, an opening bar 67 coupling with the mode motor 66, while being monitored by a mode sensor 68, moves to a bill retreat position as shown by an arrow Ex.

Then, through the movement, slope portions (c1, c2 portions) of the opening bar 67 lift up the upper feed roller 2 on front side and the upper feed roller 63 on rear side along an arrow Ey direction. Thus, the feed rollers 2 and 3 and the feed rollers 63 and 64 are opened.

Further, a protector bracket 69 carried by the carriage 18 is made of a transparent resinous material, as shown by FIG. 11C, a marker 70 whose size is the same as character is printed.

<Operations>

Figure 12:
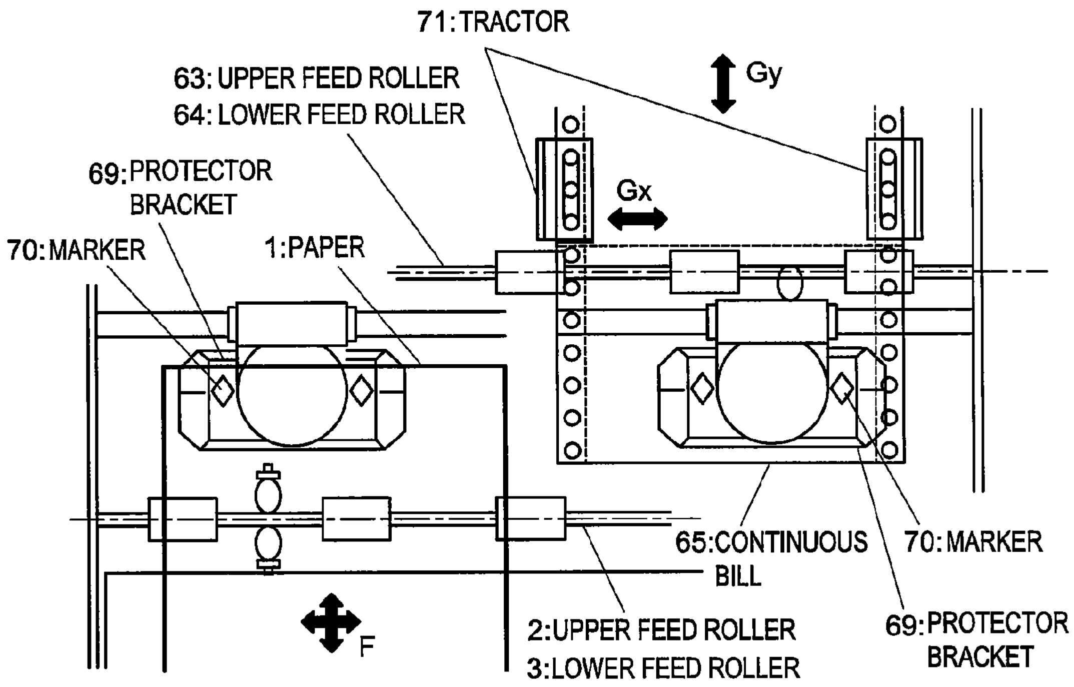
FIG. 12 is a diagram to explain operations of an image forming apparatus in embodiment 4.
Figure 13A:
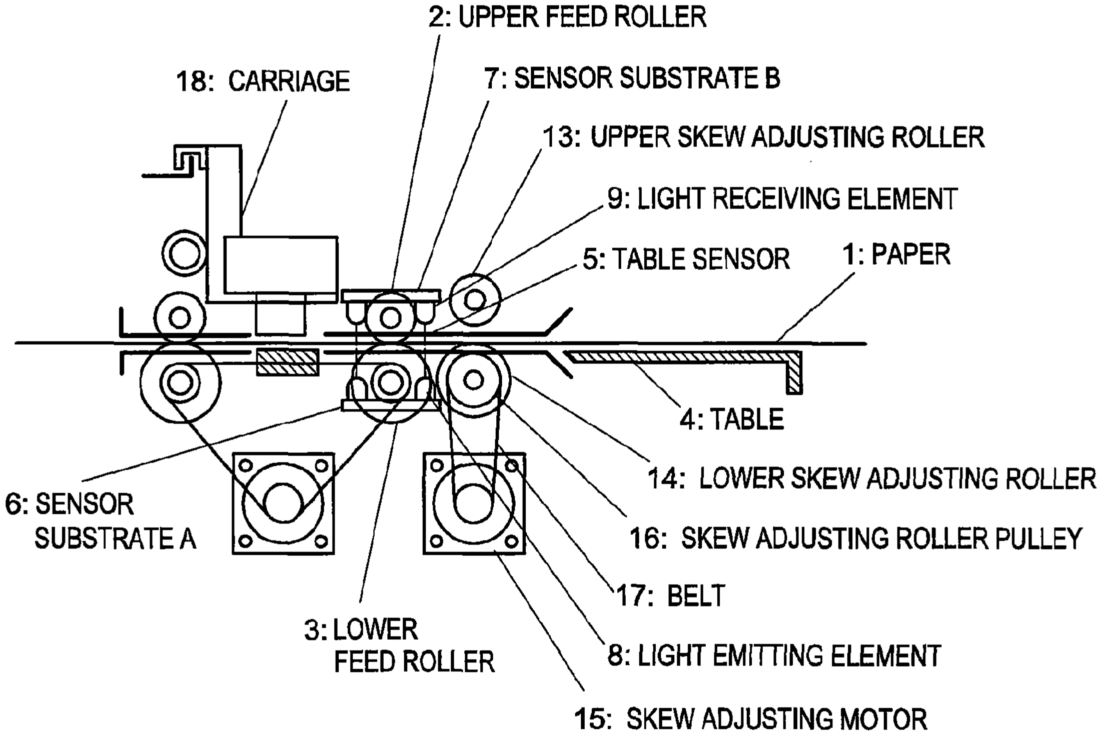
FIG. 13A (PRIOR ART)
FIG. 13A is a diagram showing a structure of a former image forming apparatus.
Figure 13B:
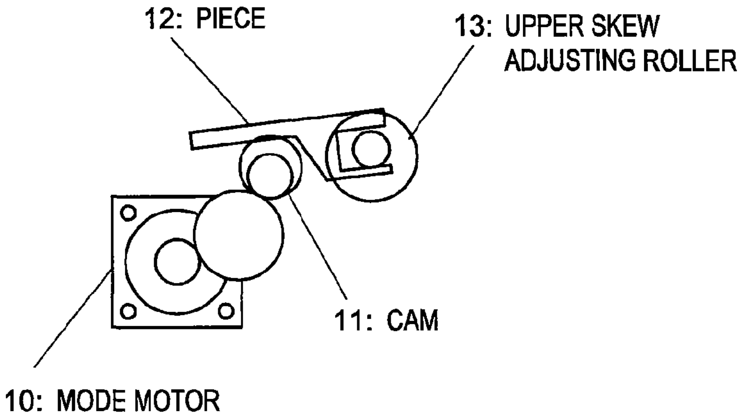
FIG. 13B (PRIOR ART)
FIG. 13B is a diagram showing a structure of a former image forming apparatus.
Figure 14:
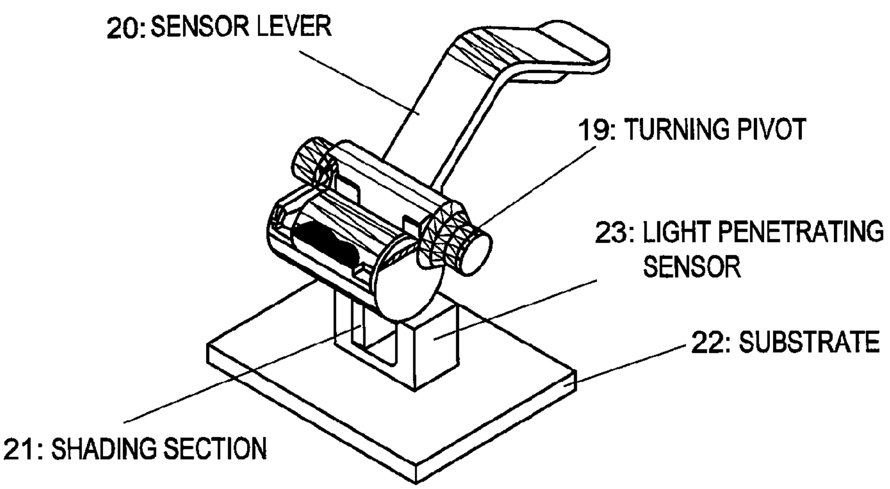
FIG. 14 (PRIOR ART)
FIG. 14 is a diagram showing a structure of a former sensor lever.
Figure 15:
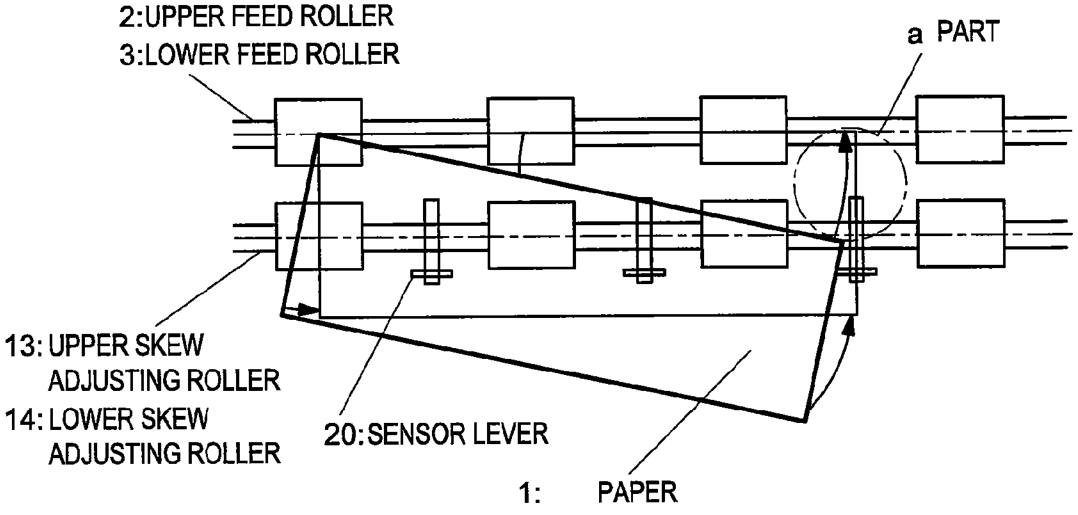
FIG. 15 (PRIOR ART)
FIG. 15 is a diagram to explain operations of a former skew adjustment.

FIG. 12 is a diagram to explain operations of an image forming apparatus in embodiment 4.

Firstly, when operator pressed a hand-operated adjustment print switch (not shown), according to a command of the controlling section (not shown), the opening bar 67 moves while being monitored by the mode sensor 68 so as to open the feed rollers 2 and 3, and the feed rollers 63 and 64.

As shown on the left side in the same drawing, in the case of single bill print, because the carriage 18 stops in a position that the marker 70 of the protector bracket 69 corresponds to the print position of first character in the single bill, the operator moves the paper 1 to a desired position by hand through the transparent protector bracket 69. That is, the operator moves and adjusts the paper 1 to the position corresponding to the first character of the paper 1 forward, backward, leftward and rightward as shown by an arrow symbol F.

Further, as shown on the right side in the same drawing, in the case of continuous bill print, because the carriage 18 also stops in a position that the marker 70 of the protector bracket 69 corresponds to the print position of first character in the continuous bill, the operator adjusts the continuous bill 65 into a breadth direction (an arrow Gx direction) of a desired position by hand together with a tractor 71 through the transparent protector bracket 69, then makes the tractor 71 and a platen knob (not shown) coupling with driving system turn forcibly, further puts the continuous bill 65 along a direction of the front and the rear as shown by an arrow Gy. Thus, the continuous bill 65 is adjusted into a breadth direction of a desired position.

As stated above, in the hand-operated adjustment print mode, even if moving the paper 1 or the continuous bill 65 forward, backward, leftward and rightward, because a sensor lever holding inclinations in all directions of 360 degrees is furnished as a paper sensor, it is possible to freely move the paper 1 or the continuous bill 65 without hitting these sensors.

Then, through press again the hand-operated adjustment print switch (not shown), the opening feed rollers 2 and 3, and the feed rollers 63 and 64 return the original positions, thus, a normal printable state is returned, and the paper setting for the hand-operated adjustment print ends.

<Effect of the Embodiment 4>

According to the image forming apparatus of the embodiment 4 stated above, in the image forming apparatus having hand-operated adjustment print function of single paper or continuous paper, because a sensor lever whose paper hit surface holds inclinations in plural directions is furnished as sensors to detect positions of paper, in which one of directions soever the paper is moved, it is possible to set the paper in simple operation without hitting.

<Transformation Example>

In the embodiments stated above, the paper hit surface of the sensor lever is provided on the upside. However, it is possible to use a structure to turn the sensor lever upside down so that the paper hit surface is provided on the underside. Further, in the case that the paper moves along a vertical direction, it is possible to furnish the sensor lever toward left or right so that the paper hit surface is provided on the left side or on the right side.

The utilization possibility on industry:

As stated above, an example regarding a paper detecting sensor in serial impact type printer is explained. However, the present invention also can be widely applied to other medium processing apparatus which conveys medium and performs predetermined process such as laser beam printer, copying apparatus, ticket issuing machine and the like.

The present invention is not limited to the foregoing embodiments but many modifications and variations are possible within the spirit and scope of the appended claims of the invention.

What is claimed is:

1. A medium detecting apparatus, comprising:

a guider defining a single plane and configured to guide medium in the plane in both a first direction and an opposite second direction; and a medium hit portion positioned within the plane of the guide and having a first medium hit surface and a second medium hit surface, the first medium hit surface extending at an angle with respect to the second medium hit surface, wherein medium traveling in the first direction engages the first medium hit surface and turns the medium hit portion in a first rotational direction, and medium traveling in the second direction engages the second medium hit surface and turns the medium hit portion in the first rotational direction, wherein a medium detection is performed through detecting that said medium hit portion is moved by a hit of said medium.

2. The medium detecting apparatus according to claim 1, further comprising:

a shading section which turns through said movement of said medium hit portion; and a sensor which detects the turn of said shading section, wherein said medium is detected according to an output of said sensor.

3. The medium detecting apparatus according to claim 1, wherein said medium hit portion approximately indicates either of a conic shape and a truncated cone shape.

4. The medium detecting apparatus according to claim 1 wherein the medium detection is performed by the medium hit portion being pressed downwardly by a hit of the medium toward the first or second medium hit surface.

5. An image forming apparatus, comprising:

a medium detecting apparatus including a guider defining a single plane and configured to guide medium in the plane in both a first direction and an opposite second direction, a medium hit portion positioned within the plane of the guider and having a first medium hit surface and a second medium hit surface, the first medium hit surface extending at an angle with respect to the second medium hit surface, wherein medium traveling in the first direction engages the first medium hit surface and turns the medium hit portion in a first rotational direction, and medium traveling in the second direction engages the second medium hit surface and turns the medium hit portion in the first rotational direction, wherein a medium detection is performed through detecting that said medium hit portion is moved by a hit of said medium.

6. The image forming apparatus according to claim 5, wherein said medium detecting apparatus further includes a shading section which turns through said movement of said medium hit portion; and a sensor which detects the turn of said shading section, wherein said medium is detected according to an output of said sensor.

7. The image forming apparatus according to claim 5, wherein said medium hit portion approximately indicates either of a conic shape and a truncated cone shape.

8. The image forming apparatus according to claim 5, wherein said medium detecting apparatus is used to serve as a detecting sensor for executing a skew adjustment.

9. The image forming apparatus according to claim 5, wherein said medium detecting apparatus is used to serve as sensors to detect a movement of a carriage and to detect said medium.

10. The image forming apparatus according to claim 5, further comprising:

a sheet guider, wherein said medium detecting apparatus is used to serve as sensor to detect a setting of said medium.

11. The image forming apparatus according to claim 5, further having:

a hand-operated adjustment print function, wherein said medium detecting apparatus is used to serve as sensor to detect a setting of said medium.

12. The image forming apparatus according to claim 5 wherein the medium detection is performed by the medium hit portion being pressed downwardly by a hit of the medium toward the first or second medium hit surface.

* * * * *